Dec. 7, 1971 L. A. BROWN ET AL 3,624,881
METHOD OF MANUFACTURING A FLANGED BI-METALLIC BUSHING
Filed June 8, 1970

INVENTORS
LARRY A. BROWN
LAVERN J. KRACHT
JOHN H. PAINE
BY
ATTORNEYS

United States Patent Office 3,624,881
Patented Dec. 7, 1971

3,624,881
METHOD OF MANUFACTURING A FLANGED BI-METALLIC BUSHING
Larry A. Brown, Peoria, Ill., Lavern J. Kracht, North Madison, Ohio, and John H. Paine, Peoria, Ill., assignors to Caterpillar Tractor Co., Peoria, Ill.
Filed June 8, 1970, Ser. No. 44,354
Int. Cl. B23p 11/00; B21d 53/10; B23k 27/00
U.S. Cl. 29—149.5                    5 Claims

ABSTRACT OF THE DISCLOSURE

A bi-metallic bushing has a sleeve portion and a flange portion wherein a relatively strong steel material is provded as a backing and a relatively thin layer of bearing material is applied thereto to form a bearing surface for both the sleeve and the flange, and wherein the sleeve portion and the flange portion are joined to each other by inertia friction welding.

BRIEF DESCRIPTION OF THE INVENTION

This invention relates to a new and improved method of manufacturing a flanged bi-metallic bushing. More particularly the invention relates to a method of manufacturing a flanged bi-metallic bushing wherein a flange member is joined to a bushing sleeve by inertia friction welding.

Friction welding may be generally described as a process wherein two workpieces are subjected to relative rotation while in rubbing contact with each other to generate friction heat to raise the workpieces to a suitable welding temperature, whereupon the relative rotation is stopped and a bond is formed between the workpieces. Inertia friction welding is a special type of friction welding wherein the energy required to bring the common interface of the workpieces to a bondable condition is stored as kinetic energy in rotating inertia weights. These weights generally take the form of flywheels that are connected to one of the workpieces and the entire energy necessary to form the bond is stored in the weights prior to the engagement of the workpieces at the interface. The stored energy is discharged into the interface through frictional heating and plastic working developed at the interface as the rubbing contact slows the rotaing weights and the bonding cycle is concluded without the use of a brake means.

The flanged bi-metallic bushing of the present invention has particular utility in a track roller assembly such as are used on track-type vehicles. Most present day track roller assemblies employ a solid cast bronze bushing. The cost of such a solid bronze cast bushing is considerable and for this reason manufacturers are constantly searching for bushing designs which are comparable or superior to such cast bronze bushings with regard to function and performance, but which are more economical to produce.

The principal object of the present invention is to provide a flanged bi-metallic bushing which comprises a steel-backed bronze sleeve having a steel-backed bronze flange joined thereto by inertia friction welding.

One of the advantages of such a flanged bi-metallic bushing construction resides in the substantially reduced cost when compared with a solid bronze bushing.

In addition, the flanged bi-metallic bushing of the present invention is stronger than conventional solid cast bronze bushings due to the greater strength of the steel backing member.

Other and further objects and advantages of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the apended claims.

DETAILED DESCRIPTION OF THE PREFERRED EMBODIMENTS

Figure 1:
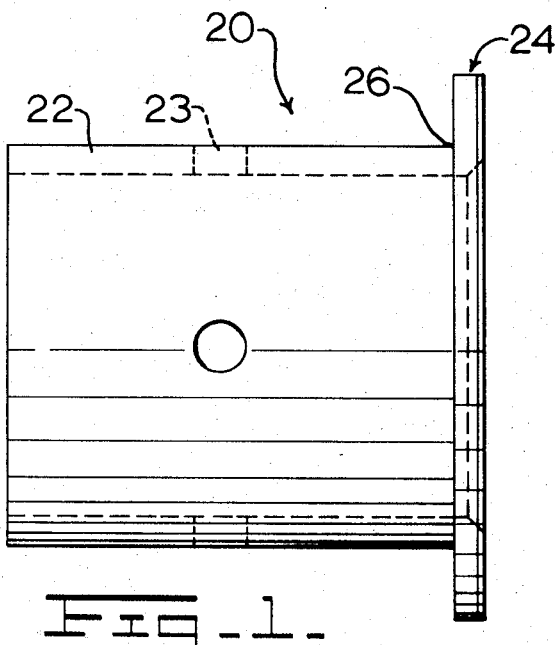
FIG. 1 is a side elevational view of the flanged bi-metallic bushing of the present invention.
Figures 2, 3, 4:
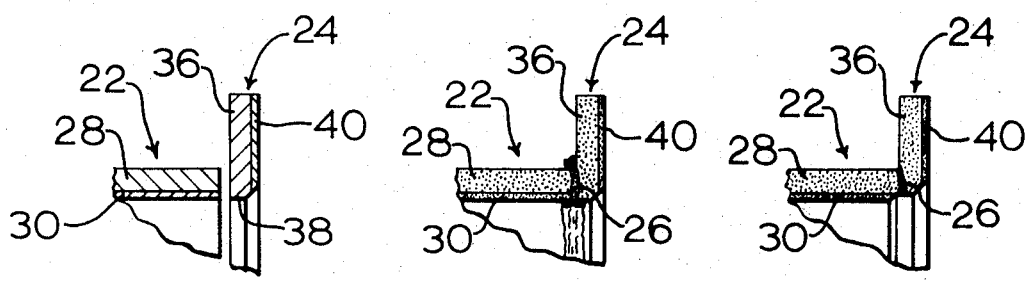
FIGS. 2–4 are cross-sectional, segmental views illustrating the manner in which a sleeve portion of the bi-metallic bushing is joined to a flange portion to form the completed bushing assembly.

Referring now to FIG. 1 there is shown a fabricated bushing assembly 20 comprising a sleeve member 22 having a flange member 24 which has been joined to the sleeve by means of a friction weld shown at 26. As shown in FIG. 2 the sleeve 22 comprises an outer shell or backing 28 formed from a relatively high strength material and a thin layer 30 of bearing material which is applied to the inner surface of the shell to provide the desired bearing characteristics.

Although there are many materials from which the inner and outer positions of the sleeve 22 could be manufactured, this particular flanged bushing application utilizes a steel outer shell 28 with a layer 30 of sintered bronze applied to the inner surface thereof. A preferable mode of manufacturing the sleeve 22 comprises coating a flat strip of steel with the sintered bronze material. The coated flat strip of steel is then formed into a sleeve or tube with the sintered bronze forming the inner diameter thereof. Suitable oil holes may be provided in the sleeve 22 as shown at 23.

The flange 24 is of similar construction and comprises an annular steel member 36 having an inner diameter 38 which is approximately equal to the inner diameter of the sleeve 22. One side of the flange 24 has a thin layer 40 of bearing material, sintered bronze in this particular application, bonded thereto.

One of the critical features of the present invention resides in joining the flange 24 to the sleeve 22 to form an integral bi-metallic flanged bushing therebetween. It has been found that conventional welding methods are unacceptable for joining the sleeve 22 to the flange 24 because the heat generated by such processes is extremely detrimental to the bearing material 30 which in the case of sintered bronze contains lead and other low melting point constituents. It has also been found that conventional welding processes are further unacceptable for forming a bond between the sleeve 22 and flange 24 because the heat generated by such conventional welding processes tends to break down the bond between the bearing material 30 and the steel backing member 28.

However, it has been found that the sleeve 22 can be successfully joined to the flange 24 by an inertia friction welding process. The inertia friction welding process has proven successful in this type of operation because of the small amount of heat introduced during the welding process and the confinement of that heat to a relatively small area. Thus, the inertia friction welding process permits the fabrication of a bi-metallic flanged bushing without damage to the bearing material per se or to the bond between the bearing material and the steel backing member.

FIGS. 2-4 illustrate the method by which the sleeve 22 can be successfully joined to the flange 24 by inertia friction welding. In FIG. 2 the sleeve assembly 22 is held stationary in the chuck of an inertia friction welding machine (not shown). The flange member 24 is chucked in a rotating spindle (not shown) of the inertia friction welder.

The flange member 24 is then rapidly rotated and the sleeve 22 and flange 24 are forced into engagement under axial pressure, as shown in FIG. 3, and a friction weld 26 is quickly formed between the steel backing members 28 and 36 of the sleeve and flange, respectively. It should be noted that the inertia friction welding of the flange member to the sleeve member takes place very rapidly with the result that only a small amount of heat is introduced into a relatively small weld area and this permits the fabrication of a flanged bi-metallic bushing without damage to the bond between the sintered bronze 30 and the steel backing 28 of the sleeve member 22.

After the flange 24 has been friction welded to the sleeve 22 as shown in FIG. 3 a machining operation is performed on the completed assembly to remove the weld flash which results in a completed bushing assembly as shown in FIG. 4. The machining operation of FIG. 4 insures that the inner surface of the sleeve 22 consists solely of the bearing material 30.

Figure 5:
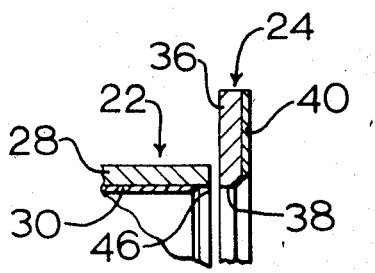
FIG. 5 is a cross-sectional, segmental view illustrating a modified embodiment of the present invention.

FIG. 5 shows an alternate embodiment of the invention wherein a small portion of the sintered bond material 30 has been machined away from the end 46 of the sleeve 22 which is to be welded to the flange 24. While this operation is not absolutely essential to produce a good weld between the sleeve and flange it does help avoid any possibility of damaging the bond between the sintered bronze 30 and the steel backing 28 during the inertia friction welding operation.

While we have illustrated and described preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A method of manufacturing a flanged bi-metallic bushing comprising:
    coating a flat strip of steel with a relatively thin layer of bearing material;
    forming the coated steel strip into a tubular sleeve wherein the bearing material comprises an inner circumferential wall and the steel forms an outer backing therefor;
    providing a ring-shaped steel plate having an inner diameter approximately equal to the inner diameter of the steel backing;
    coating a first side of the ring-shaped steel plate with a relatively thin layer of bearing material;
    performing an inertia friction welding operation to permanently join the uncoated side of the ring-shaped plate to one end of the tubular sleeve;
    removing any flash material produced in the inertia friction welding operation so that the inner surface of the tubular sleeve consists solely of said bearing material.

2. A method of manufacturing a flanged bi-metallic bushing as set forth in claim 1 and further comprising removing a small portion of said bearing material from said one end of the tubular sleeve prior to the welding operation so that only the steel backing portion of the sleeve is utilized in forming the friction weld between the sleeve and the ring-shaped plate.

3. A method of manufacturing a flanged bi-metallic bushing as set forth in claim 1 wherein the thin layer of bearing material for both the tubular sleeve and the ring-shaped plate comprises sintered bronze.

4. A method of manufacturing a flanged bi-metallic bushing as set forth in claim 2 wherein the thin layer of bearing material for both the tubular sleeve and the ring-shaped plate comprises sintered bronze.

5. A method of manufacturing a flanged bi-metallic bushing comprising:
    coating a flat strip of steel with a relatively thin layer of bearing material;
    forming the coated steel strip into a tubular sleeve wherein the bearing material comprises an inner circumferential wall and the steel forms an outer backing therefor;
    providing a ring-shaped steel plate having an inner diameter approximately equal to the inner diameter of the steel backing;
    coating a first side of the ring-shaped steel plate with a relatively thin layer of bearing material;
    performing a friction welding operation to permanently join the uncoated side of the ring-shaped plate to one end of the tubular sleeve;
    removing any flash material produced in the friction welding operation so that the inner surface of the tubular sleeve consists solely of said bearing material.

References Cited

UNITED STATES PATENTS

| | | | |
|---|---|---|---|
| 1,809,838 | 6/1931 | Fiegel et al. | 29—149.5 R |
| 2,242,441 | 5/1941 | Shoemaker et al. | 29—149.5 R |
| 3,144,710 | 8/1964 | Hollander et al. | 29—470.3 |
| 3,497,942 | 3/1970 | Weiss | 29—470.3 |

THOMAS H. EAGER, Primary Examiner

U.S. Cl. X.R.

29—470.3